United States Patent [19]

Brown

[11] 4,169,658
[45] Oct. 2, 1979

[54] PICTURE SCREEN
[75] Inventor: Donald J. Brown, Naperville, Ill.
[73] Assignee: Knox Manufacturing Co., Wood Dale, Ill.
[21] Appl. No.: 871,960
[22] Filed: Jan. 24, 1978
[51] Int. Cl.² .............................................. G03B 21/56
[52] U.S. Cl. ..................... 350/118; 352/36; 353/15
[58] Field of Search ................. 350/117, 118; 352/36; 353/15, 18

[56] References Cited
U.S. PATENT DOCUMENTS

| 1,945,710 | 2/1934 | Smoot | 350/118 |
| 1,955,682 | 4/1934 | Newman et al. | 350/118 |
| 2,004,583 | 6/1935 | Newman | 350/118 |

Primary Examiner—Richard A. Wintercorn
Attorney, Agent, or Firm—Wegner, Stellman, McCord, Wiles & Wood

[57] ABSTRACT

A picture screen comprising an upright standard, a leg unit supporting the standard, a roller adapted to receive a picture screen, a picture screen mounted on the roller and adapted to be unwound from a closed position to an open position, an elongated screen casing for receiving the roller and the screen coupled to the upright standard, and casing extensions integrally formed with the screen casing and each being provided with a speaker mounted therein. The speakers project the sound toward the viewer/listener to provide a lifelike effect with the picture projected on the screen.

14 Claims, 9 Drawing Figures

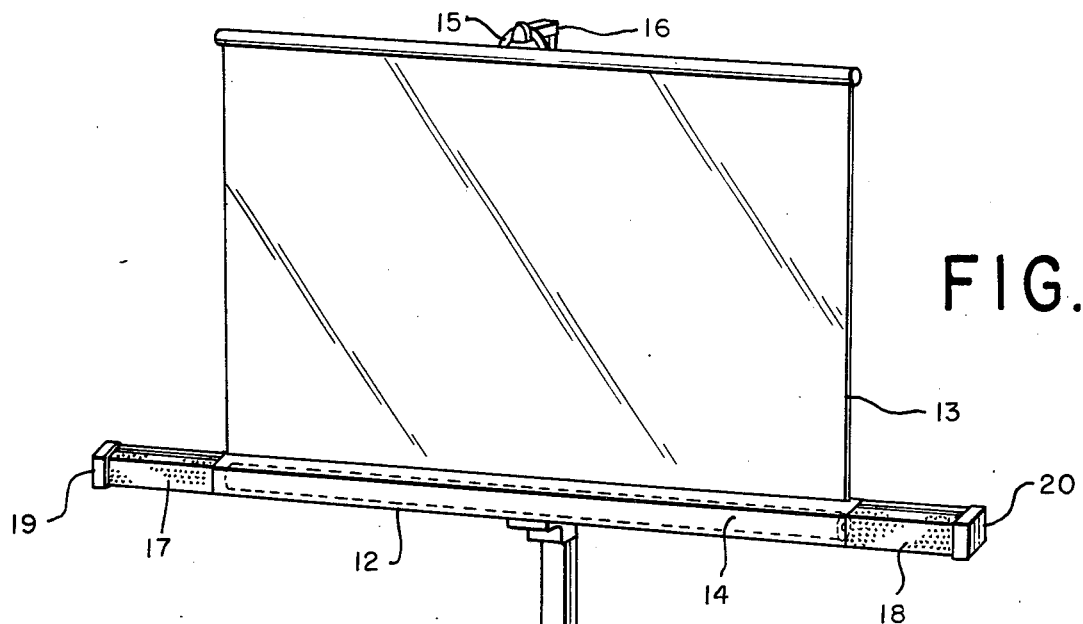
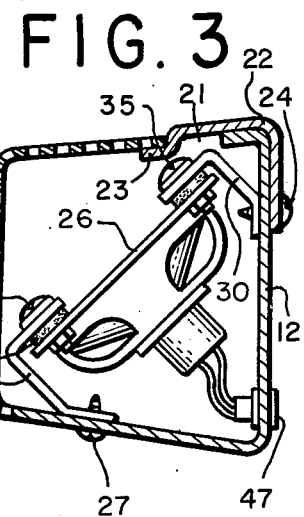
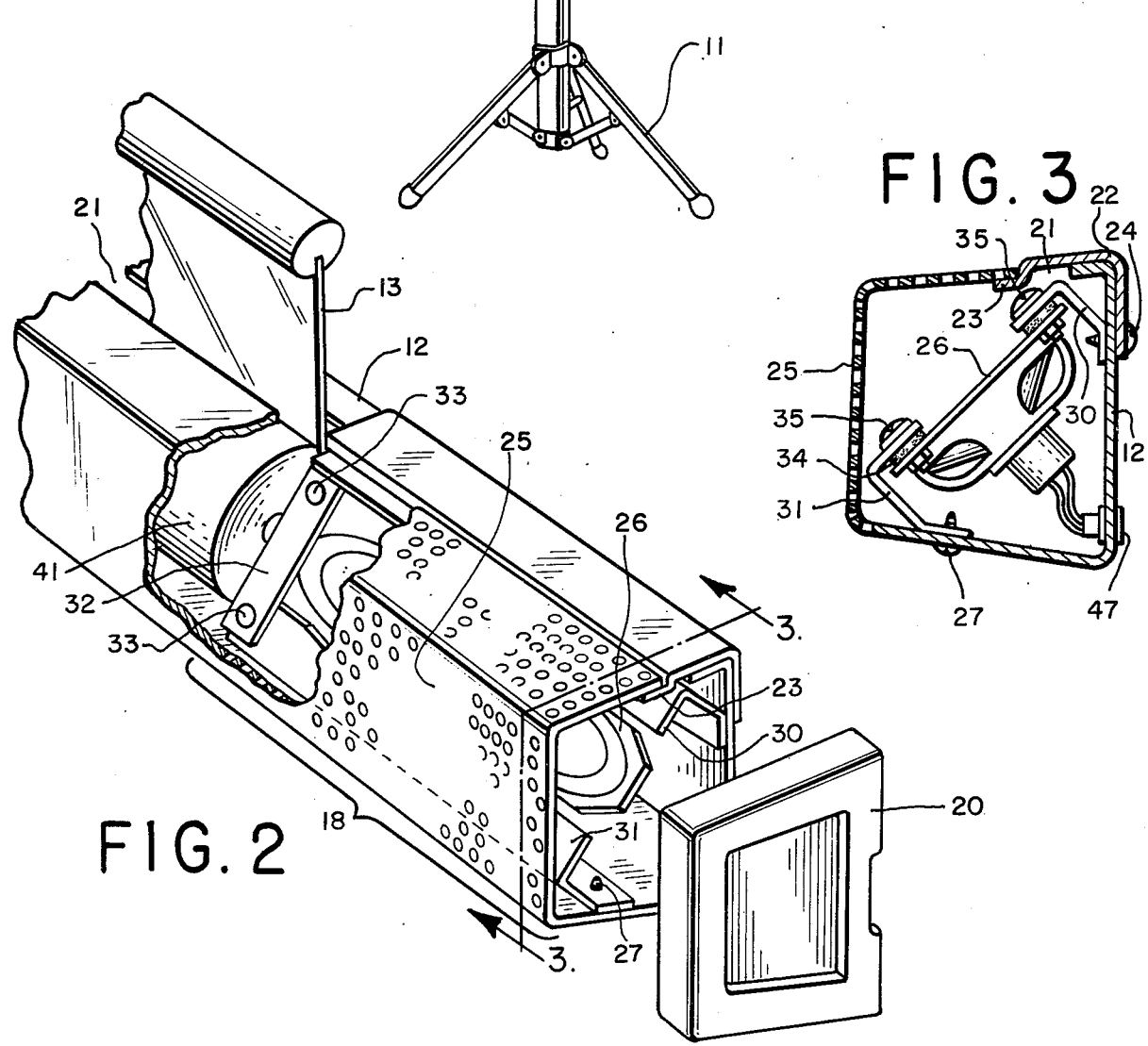

PICTURE SCREEN

BACKGROUND OF THE INVENTION

The present invention relates to portable picture screens and, more particularly, to a hollow screen casing for accommodating sound speakers.

Recent improvements in home sound movies have made this form of entertainment enjoyable and rewarding at a moderate cost. It is common to utilize two separate speakers supported on the floor adjacent the picture screen for projecting sound to the home audience. The separate speakers are electrically connected to the movie projector by a cord coupled to jacks which are inserted into appropriate receptacles in the projector housing. The performance of this arrangement is satisfactory; however, separate storage of the speakers is inconvenient. It is equally inconvenient to transport the separate speakers, the screen and the projector to a remote place for viewing.

SUMMARY OF THE INVENTION

In accordance with the present invention, an elongated hollow screen casing has at least one hollow speaker housing secured to its end(s) for accommodating a speaker assembly for projecting sound forwardly of the screen toward the audience for a lifelike effect. The speaker assembly includes bearing brackets which journal a shade-type roller to which the viewing screen is secured. The speaker assembly forms a strut to provide strength to the hollow screen casing and is provided with resilient speaker mounting means which preclude torsional forces from the spring roller being imparted to the speaker. Since no torsional forces are imparted to the speaker, sound from it is not distorted. The sound screen is easily transported and stored and encourages the use of home sound movies.

The primary object of the invention is to provide a screen casing having sound speakers mounted therein for use in showing sound movies.

Another object of the invention is to mount the speakers in the casing so that the sound projects toward the viewer/listener in a lifelike manner coordinated with the movie being projected.

Another object is to provide a speaker assembly having a bearing bracket which receives an end of the shade-type roller on which the viewing screen is attached.

Yet another object of the invention is to provide a speaker mounting assembly that precludes torsional stress from being imparted from the bearing brackets to the speakers so that sound therefrom is not distorted.

DRAWING

FIG. 1 is a front elevational view of a picture screen in its open position with a screen casing having speakers in accordance with the present invention;

FIG. 2 is an exploded perspective view of the right end of the screen casing of FIG. 1;

FIG. 3 is a cross-sectional view taken along the line 3—3 of FIG. 2;

DESCRIPTION OF PREFERRED EMBODIMENT

Figure 4:
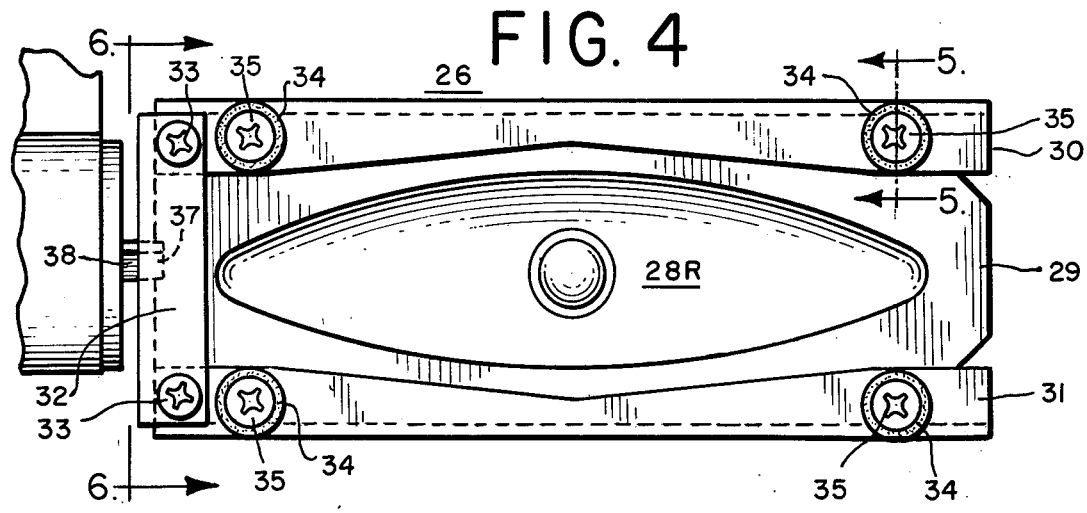
FIG. 4 is a front view of the speaker assembly to be mounted in the screen casing.

In the embodiment illustrated, a standard generally designated 10 is provided with a leg unit generally designated 11 for supporting the standard in the upright position. A screen casing 12 is coupled to standard 10 by a mounting cradle (not shown). However, it is apparent that the screen casing 12 may be secured directly to a wall, in which case the standard 10 and leg unit 11 would not be needed.

A screen 13 is mounted on a roller 14 to be unwound from a closed position to an open position, as shown. A bail member 15 is retained by a bail support 16 to keep the screen 13 in the open position. The screen 13 is secured to roller 14 and is received within screen casing 12 when in the closed position.

A left speaker housing 17 and a right speaker housing 18 are attached to or integrally formed with the left and the right ends, respectively, of screen casing 12. As shown in FIG. 1, the left and right speaker housings 17 and 18 are defined by perforations in the thin sheet metal which forms the screen casing 12. Speakers are mounted in the left and right speaker housings and sound from them passes through the perforations. A left end cap 19 and a right end cap 20 are positioned over the ends of the casing extensions 17 and 18, respectively.

Referring to FIGS. 2 and 3, a description of the right speaker housing 18 will be provided, it being understood that the left speaker housing 17 is of substantially similar construction.

Screen casing 12 may be formed from a single piece of thin sheet metal, as best seen in FIG. 3. A longitudinally extending slot 21 extends along the axis of the screen casing 12 and provides an opening for screen 13. An L-shaped bracket 22, having an offset end or lip 23, is received within slot 21 to close it and is secured to screen casing 12 by screws 24. Perforations 25 are provided along the length of casing 12 for a distance substantially equal to the length of bracket 22. The perforations 25 extend for a length sufficient to accommodate speaker assembly 26. Speaker assembly 26 is received within the hollow casing 12 and is secured by screws, as screws 24 and 27.

Figure 5:
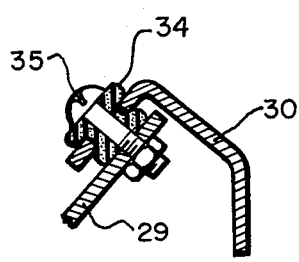
FIG. 5 is a cross-sectional view taken through the lines 5—5 of FIG. 4.
Figure 6A:
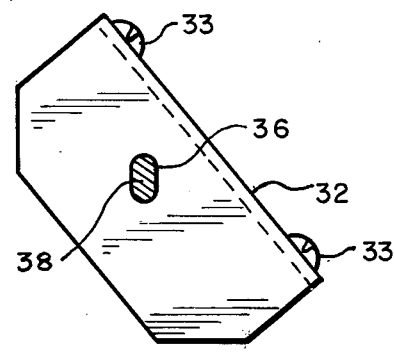
FIG. 6A is an end view of the bearing bracket for receiving the flattened end of the reel support extending from the spring-actuated reel of the shade-type roller.

Referring to FIGS. 4, 5 and 6A, speaker assembly 26 will now be described. The speaker assembly 26 includes an oval speaker 28-R mounted in a rigid speaker frame 29 of the well-known type and an upper flange 30, a lower flange 31 and a bearing bracket 32, which is secured to the upper and lower flanges 30 and 31 by screws 33. The bearing bracket 32 forms a strut to make the thin sheet metal casing 12 more rigid and receives and retains shade roller 14, as will be discussed below. Resilient grommets and nut and bolt assemblies, as grommet 34 and nut and bolt assembly 35, secure the rigid speaker frame 29 to the upper and lower flanges 30 and 31.

Figure 6B:
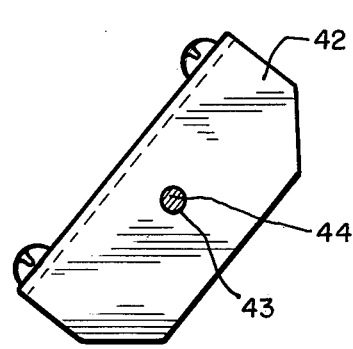
FIG. 6B is an end view of a bearing bracket for the opposite end having a retaining hole which receives the reel support from the spring-actuated reel of the shade-type roller.
Figure 7:
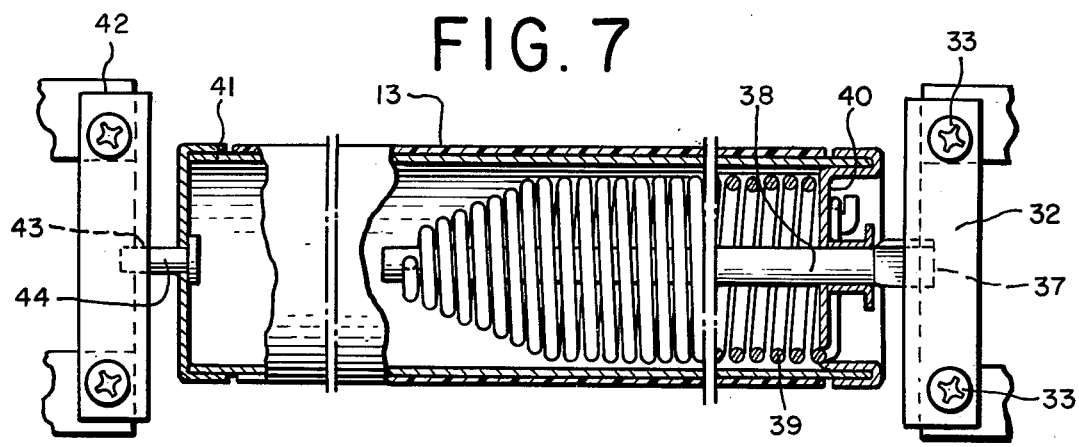
FIG. 7 is a cross-sectional view of the shade-type roller journaled between the bearing brackets.

Referring to FIG. 7, bearing bracket 32 is provided with a slot 36 which receives a flattened end 37 of pin 38. Pin 38 is coupled to a spring 39 which develops and imparts a torsional force to roller-retaining ring 40 secured to outer casing 41 of the roller 14. Similarly, as shown in FIG. 6B, a bearing bracket 42 is employed for the speaker assembly in the left speaker housing 17 and is of similar construction to bearing bracket 32. However, in lieu of retaining slot 36, bearing bracket 42 contains a hole 43 which receives the round end of pin 44 from roller 14.

The operation of a typical shade roller and bearing bracket is discussed in detail in U.S. Pat. No. 3,063,495. Briefly, however, the pins 38 and 44, spring 39 and ring 40 apply a sufficient force to outer casing 41 to return screen 13 from its open position, as shown in FIG. 1, to a closed position, wound upon the roller 14.

It is, therefore, apparent that when the screen 13 is in its open position, pin 38 imparts a torque to bearing bracket 32 which tends to twist flanges 30 and 31. The resilient grommets, as grommet 34, absorb the majority of the torque so that rigid speaker frame 29 is not twisted and the sound from speakers 28 is not distorted.

Figure 8:
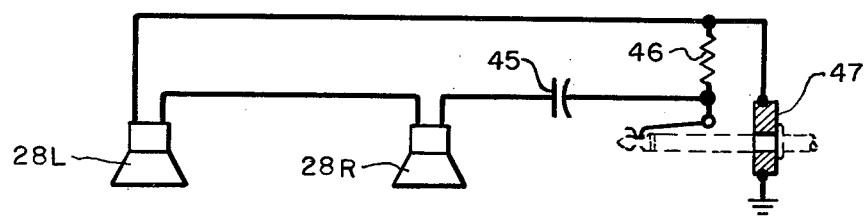
FIG. 8 is a typical schematic diagram of a speaker circuit.

Although the electrical configuration of the speakers substantially depends upon the characteristics of the signal from the sound projecting equipment, left and right speakers 28-L and 28-R are shown in FIG. 8 to be connected in series through capacitor 45 across resistor 46. The electrical conductors connecting speakers 28-L and 28-R may extend through casing 12. Capacitor 45 is selected to remove low frequencies, as 250 Hz or lower. When a signal is applied to a casing-mounted jack 47 from the sound equipment, speakers 28-L and 28-R are energized.

The speakers 28-L and 28-R are capable of projecting the sound toward the viewer/listener to provide a more lifelike effect wherein the sound and the picture projected are coordinated with each other.

I claim:

1. A picture screen device, comprising:
  an elongated hollow casing having two ends and a longitudinally extending slot;
  an elongated spring-actuated roller journaled in the casing;
  a flexible screen web secured to the roller and adapted to be unwound from a closed position to an open position, the screen web being wound upon the roller in said closed position and being unwound from the roller in an exposed open position;
  a hollow speaker housing secured to one end of said casing;
  a speaker assembly mounted within the speaker housing; and
  circuit means for transmitting audio signals to said speaker assembly.

2. The picture screen device of claim 1 further including:
  a second hollow speaker housing secured to the other end of said casing;
  a second speaker assembly mounted within the second speaker housing; and
  second circuit means for transmitting audio signals to said second speaker assembly.

3. The picture screen device of claim 1 wherein the hollow speaker housing is integrally formed with the elongated hollow casing.

4. The picture screen device of claim 2 wherein each speaker assembly includes a bearing bracket for receiving said spring-actuated rotatable elongated roller.

5. The picture screen device of claim 4 wherein each speaker assembly includes a speaker mounted on a rigid frame, and resilient means are disposed between said bearing brackets and said rigid frame.

6. An elongated picture screen comprising:
  a roller;
  a screen mounted on said roller and adapted to be unwound from a closed position to an open position;
  a screen casing for rotatably receiving said roller;
  a casing extension integrally formed with said screen casing to afford a speaker housing adjacent one end of the casing;
  a casing extension integrally formed with said screen casing to afford a speaker housing adjacent the other end of the casing; and
  speaker means mounted within said speaker housings.

7. A picture screen comprising:
  an upright standard;
  a leg unit supporting said standard;
  a roller adapted to receive a picture screen;
  a picture screen mounted on said roller and adapted to be unwound from a closed position to an open position;
  a screen casing for receiving said roller and said screen, said screen casing coupled to said upright standard;
  a casing extension integrally formed with said screen casing to afford a speaker housing adjacent one end of the casing;
  a casing extension integrally formed with said screen casing to afford a speaker housing adjacent the other end of the casing; and
  speaker means mounted within said speaker housings.

8. The picture screen of claim 7 further including:
  speaker assembly means secured to said speaker means for receiving said roller and retaining said speaker means within the casing.

9. The picture screen of claim 7 wherein said screen casing and said extensions are formed from a single piece of sheet metal and said speaker housings are defined by perforations in said sheet metal through which sound can pass.

10. The picture screen of claim 7 wherein said speaker assembly means includes:
  an upper flange and a lower flange adapted to be secured to said casing for receiving said speaker means;
  a bearing bracket coupled to said flanges for receiving said roller, and
  means for securing the speaker means to the speaker assembly.

11. The picture screen of claim 10 wherein said means for securing the speaker means to the speaker assembly includes:
  resilient grommets disposed between said speaker means and said upper and lower flanges; and
  nut and bolt assemblies for retaining said grommets therebetween.

12. In a picture screen having an upright standard, a leg unit supporting said standard, a roller on which is mounted a picture screen adapted to be unwound from a closed position to an open position, an elongated screen casing for receiving said roller and said screen, the improvement comprising:

a casing extension integrally formed with said screen casing to afford a speaker housing adjacent one end of the casing;

a casing extension integrally formed with said screen casing to afford a speaker housing adjacent the other end of the casing, each casing extension including perforations in its screen casing through which sound can pass; and speaker means mounted within said speaker housings.

13. The elongated picture screen of claim 6 wherein said screen casing forms a brace for said speaker means to prevent distortion of sound from said speaker.

14. The picture screen of claim 7 wherein said screen casing forms a brace for said casing extension to prevent distortion of the sound from said speaker means.